Dec. 16, 1930.   R. GERBER   1,785,548
DOUBLE END DRIVE REVERSE CLUTCH
Filed Dec. 30, 1929   2 Sheets-Sheet 2
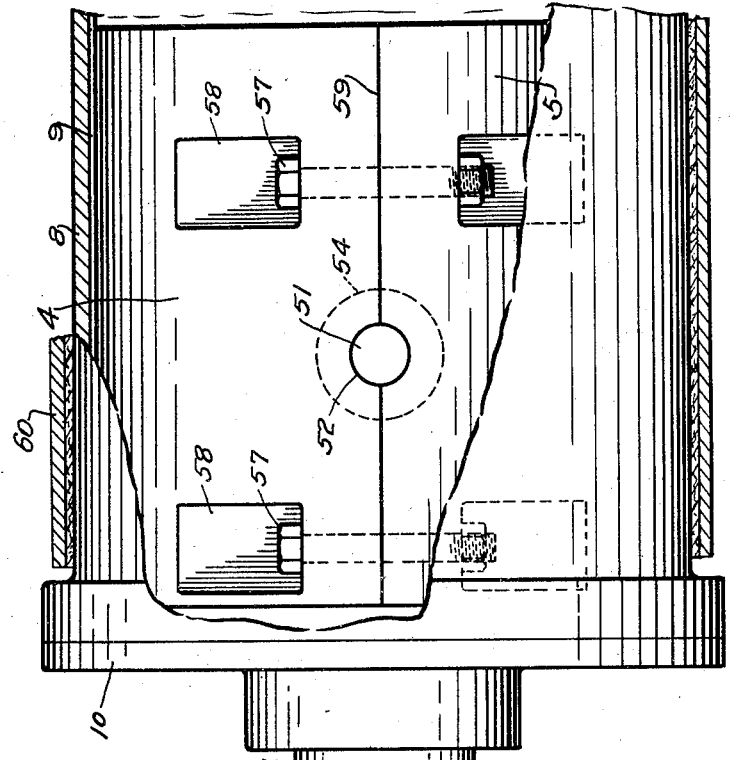
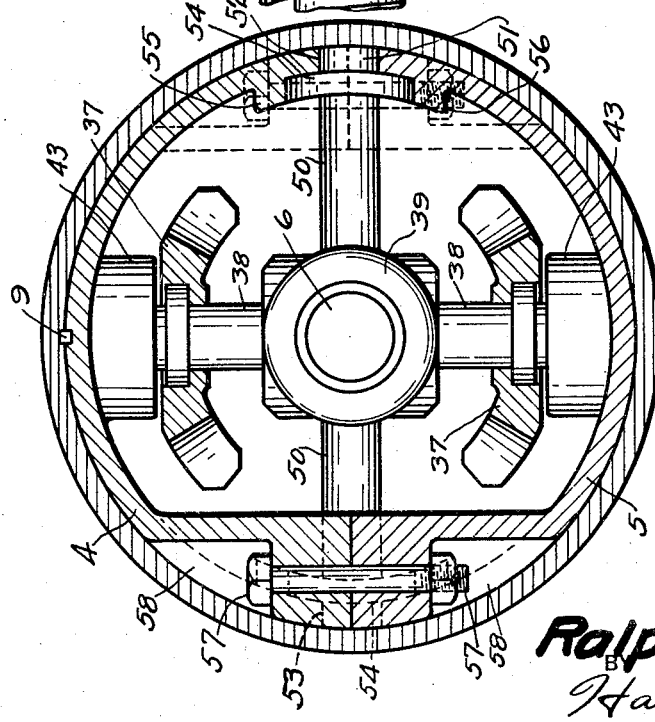
INVENTOR
*Ralph Gerber*
BY
*Harry Bowen*
ATTORNEY Patented Dec. 16, 1930

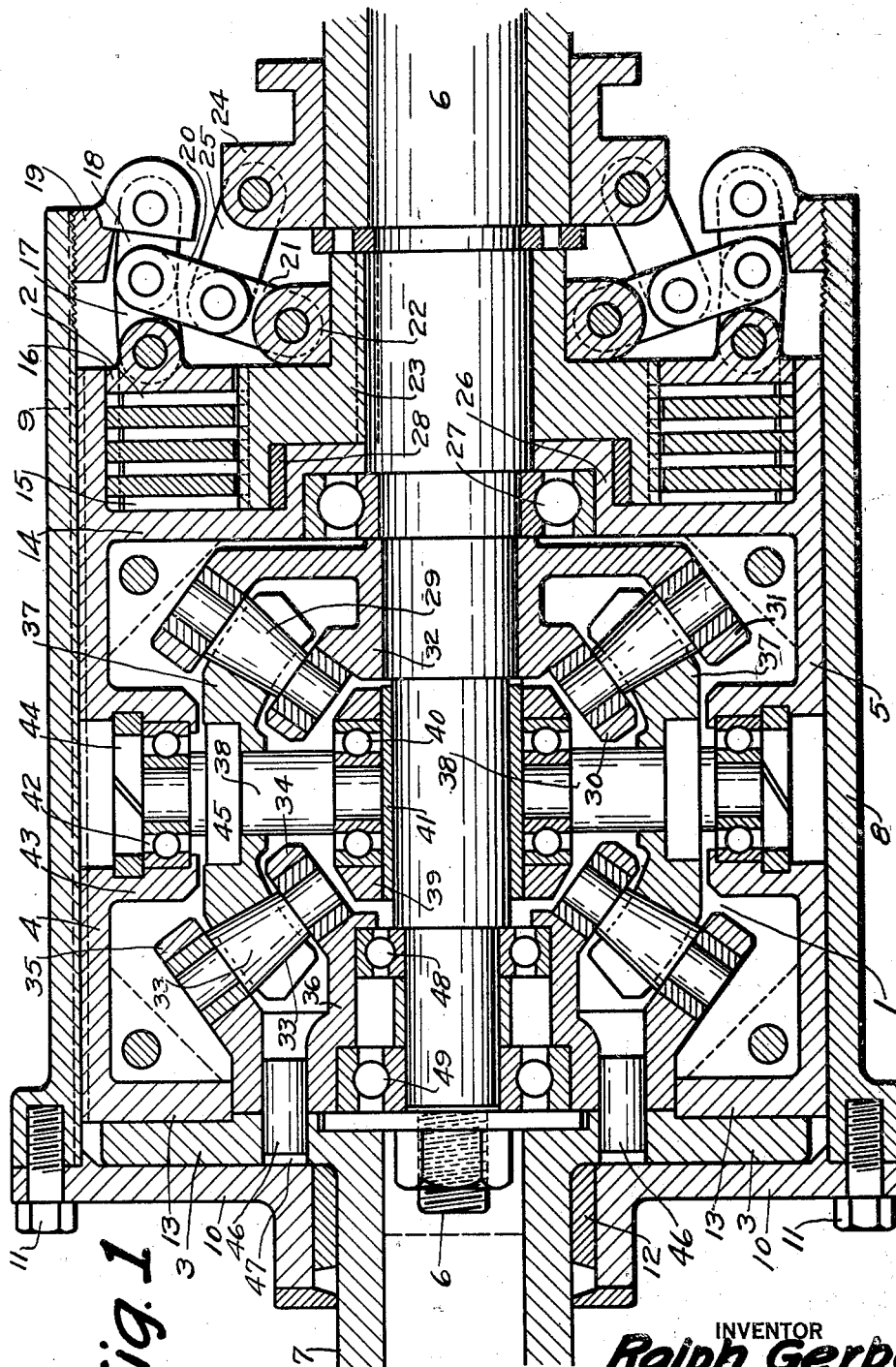

1,785,548

UNITED STATES PATENT OFFICE

RALPH GERBER, OF RAYMOND, WASHINGTON

DOUBLE-END-DRIVE REVERSE CLUTCH

Application filed December 30, 1929. Serial No. 417,323.

The invention is a reverse gear having a double end drive which locks the entire device as a unit and relieves the internal parts of driving strains when going ahead.

The invention is an improvement over my prior application which was filed February 24, 1927 with the Serial Number 170,563 in that the internal parts are mounted in a floating drum with friction clutch members at each end of the drum so that when driving ahead the drum will be held as a unit and the strains will not pass through the internal parts.

The object of the invention is to provide a reverse clutch adaptable to withstand considerable shock load which is so constructed that when driving ahead the entire device will be locked at both ends and the internal parts will be relieved of all working strain.

Another object of the invention is to provide a reverse clutch having a double end drive with a double toggle for operating the clutches so that the pressure may be considerably intensified.

A further object of the invention is to provide a double end drive reverse clutch in which the floating inner drum is formed in two halves and bolted together.

And a still further object of the invention is to provide a double end drive reverse clutch which is of a simple and economical construction.

With these ends in view, the invention embodies a reverse clutch as described in my prior application in which the radial spindles are mounted in a floating drum with clutch members at both ends adaptable to hold the drum and internal parts to the exterior casing and a special arrangement of levers, forming a double toggle for intensifying the pressure of the clutch.

Other features and advantages of the invention will appear from the following description taken in connection with the drawings, wherein:

Figure 1 is a longitudinal section through the center of the clutch.

Figure 2 is a cross section through the approximate center with portions broken away for showing the keys for locating the two halves of the floating drum and also the bolts for holding the halves together.

Figure 3 is a view showing a side elevation with part of the outer casing broken away.

In the drawings the clutch is shown as it would be made wherein numeral 1 indicates the reverse drive mechanism, numeral 2 the clutch mechanism at one end, and numeral 3 the clutch at the opposite end.

The mechanism 1 is mounted in a split drum shaped casing formed by the members 4 and 5 and in the center thereof is a shaft 6 driven from a motor or engine by any suitable means. At the opposite end of the device is a hub 7 to which a driven shaft may be connected by any suitable means. The entire device is surrounded with a cylindrical casing 8 to which the drum shaped casing is held by a key 9 and it will be noted that at one end is a head 10 which is held in place by bolts 11 and in the center of the head is a bearing 12 in which the hub 7 is rotatably mounted.

The clutch 3 is formed by a flange, as indicated by the numeral 3, at the inner end of the hub 7 and it will be noted that this flange may be frictionally gripped between the head 10 and a flange 13 at the end of the casings 4 and 5. Adjacent to the opposite end of the casing formed by the members 4 and 5 is another flange 14 which contacts with the gripping members 15 of the friction clutch 2.

The friction clutch is formed by plates 15 held by an outer ring 16 which is moved inward or outward by levers 17 or 18 in which the lever 18 is pivotally mounted in a ring 19 at the open end of the casing. These levers are operated by levers 20 and 21 forming another toggle with one end pivoted in a floating ring 22 on a driving hub 23 which is mounted upon and keyed to the shaft 6. The end of the hub 23 is made a little longer than the width of the ring 22 to provide extra travel or clearance to permit longer travel for the clutch control collar 24. The levers 20 and 21 are connected by a sliding collar 24 through a lever 25. It will therefore be observed that through this combination of levers a double toggle action is obtained so that a tremendous pressure may be exerted upon the clutch. It will be noted that the central part of the flange 14 is provided with a hub 26 which is mounted upon the shaft 6 through a ball bearing 27 and another bearing is provided between the sleeve 23 and the hub 26 which is indicated by the numeral 28. This bearing 28 is formed of a tough bronze ring which besides forming a bearing for the hub 23 also forms a band to rigidly hold the two half sections 4 and 5 of the split drum shaped casing together to prevent them opening up around the bearing 27, and this ring also forms a seal or packing gland to prevent oil from the interior leaking out around the hub to the clutch plates.

The reverse mechanism, as indicated by the numeral 1, is formed on the interior of the casing formed by the members 4 and 5, and is formed by beveled inclined rollers 29 held between flanges 30 and 31 extending from a hub 32, and oppositely positioned similar rollers 33 held between flanges 34 and 35 extending from a hub 36, and heavy toothed sprockets 37 mounted upon radially extending spindles 38 as shown. The spindles 38 are rotatably mounted at their inner ends in a hub 39 through bearings 40 with a sleeve 41 through the center thereof and through which the hub is mounted upon the shaft 6. The outer ends of the spindles are mounted in bearings 42 in hubs 43 extending inward from the casing formed by the members 4 and 5. The bearings 42 may be held in the hubs 43 by split spring rings 44 as shown, and the sprockets 37 may be mounted upon the spindles 38 by collars 45 or in any suitable manner.

It will be noted that the hub 36 is provided with stud pins 46 that extend into openings 47 in the member 3 so that they will be forced to rotate in unison and also that the hub 36 is mounted upon the shaft 6 through bearings 48 and 49.

The clutch is provided with arms 50 which extend outward from the hub 39 as shown in Figure 2 and it will be noted that the outer ends 51 of these arms form keys which fit into notches 52 and 53 in the members 4 and 5 to locate them when assembling. Adjacent to the outer ends of the arms 50 are collars 54 and it will be noted that the members 4 and 5 are provided with bosses 55 and 56 which engage the collars. The members 4 and 5 are rigidly held together by the bolts 57 in recesses 58 and form a drum shaped casing which is split longitudinally on the line 59.

The cylindrical casing 8 is surrounded by a brake 60 as shown in Figure 3, so that the housing may be held when desired to hold the sprocket assembly in order to obtain a reverse drive. It will be noted that with the clutches on the interior released and the brake band gripping the outer housing 8, the driving element will rotate the sprockets 37, and as the spindles upon which the sprockets are mounted are held in a stationary position these sprockets will in turn rotate the driven element in a direction opposite to that of the driving element.

It will be understood that changes may be made in the construction without departing from the spirit of the invention. One of which changes may be in the design or arrangement of the clutch members, another may be in the use of the housing and clutch members with any other type of reverse gearing, and still another may be in the use of other means for operating the clutch members.

The construction will be readily understood from the foregoing description. In use the clutch may be provided as shown and described and it will be understood that it may be used in the drive shaft of a boat or other device where it is desired to reverse the drive and it will be observed that when driving ahead the clutch members will be in the position shown in the drawing and the interior will be held as a unit so that the driving strain will pass directly through the housing and not through the internal parts. The only strain that will be exerted on the interior is when the device is being used for driving in reverse and then the strains are taken directly through the reverse gearing. This arrangement is a decided improvement over that of the prior application because the interior parts are relieved of all driving strains and stresses when driving forward.

Having thus fully described the invention, what I claim as new and desire to secure by Letters Patent, is:—

1. In a reverse gear of the character described, coaxially arranged driving and driven elements each having circumferential sets of rollers, an assembly of rotatably mounted sprockets each of which is in permanent engagement with both of said sets of rollers, a floating split drum shaped housing, in which the said elements are mounted, friction clutches at both ends of the housing for holding the said driving and driven elements in relation to the said housing, means for operating the said clutches from one end through the housing, a suitable surrounding casing, and releasable means for holding the said surrounding casing.

2. In a reverse gear of the character described, a drum shaped housing, coaxially arranged driving and driven elements each having circumferential sets of rollers, an assembly of rotatably mounted sprockets each of which is in permanent engagement with both of said sets of rollers, friction clutches at both ends of the housing for holding the said driving and driven elements in relation to the said housing, a double toggle for operating both of the clutches from one end of the housing, a suitable surrounding casing, and releasable means for holding the said surrounding casing.

3. In a reverse gear of the character described, a drum shaped housing, coaxially arranged driving and driven elements each having circumferential sets of rollers, an assembly of rotatably mounted sprockets each of which is in permanent engagement with both of said sets of rollers, suitable friction clutches at both ends of the housing for holding the said driving and driven elements in relation to the said housing, a double toggle for operating the said clutches from one end, a suitable outer cylindrical housing with means at the ends for taking the stress of the clutch action, and releasable means for holding the said outer cylindrical housing.

4. In a reverse gear of the character described, a drive shaft, a connection for a driven shaft in axial alignment with the said drive shaft, outwardly extending inclined flanges mounted on the said drive shaft, tapered rollers rotatably mounted between the said inclined flanges, other inclined flanges rotatably mounted on the said drive shaft and connected to the driven shaft connection, tapered rollers also rotatably mounted between the said latter inclined flanges, a plurality of heavy toothed sprockets engaging with both sets of the said tapered rollers, a split drum shaped casing surrounding the said rollers, flanges, and sprockets, radially positioned spindles rotatably mounted in the said drum shaped casing and upon which the said sprockets are mounted, friction clutches at the ends of the said drum shaped casing for holding the said driving and driven elements in relation to the said housing, double action toggles for exerting the pressure upon the said clutch members, a suitable housing surrounding the said device, and releasable means for holding the said surrounding casing.

5. In a reverse gear of the character described, a drum shaped housing, coaxially arranged driving and driven elements each having circumferential sets of rollers, an assembly of rotatably mounted sprockets each of which is in permanent engagement with both of said sets of rollers, a drive shaft extending into and substantially through the housing and connected to the said driving element, a connection for a driven shaft attached to the said driven element, suitable friction clutches at both ends of the housing for holding the said driving and driven elements in relation to the said housing, a double toggle for operating the clutches at both ends from one end, a suitable outer cylindrical housing arranged to take the clutch thrust at both ends, and releasable means for holding the said outer cylindrical housing.

In testimony whereof I affix my signature.

RALPH GERBER.